United States Patent

[11] 3,624,345

| | | |
|---|---|---|
| [72] | Inventor | Frank W. Armstrong<br>Barberton, Ohio |
| [21] | Appl. No. | 772,326 |
| [22] | Filed | Oct. 31, 1968 |
| [45] | Patented | Nov. 30, 1971 |
| [73] | Assignee | The Babcock & Wilcox Company<br>New York, N.Y. |

[54] ARC WELDING ELECTRODE ARRANGEMENTS
1 Claim, 7 Drawing Figs.

[52] U.S. Cl. .................................................. 219/130,
219/76, 219/137
[51] Int. Cl. .................................................. B23k 9/00
[50] Field of Search .......................................... 219/137,
131, 130, 121, 76, 77

[56] References Cited
UNITED STATES PATENTS

| 2,669,640 | 2/1954 | Outcalt et al. | 219/76 |
| 2,756,311 | 4/1956 | Persson et al. | 219/130 |
| 2,837,627 | 6/1958 | Soulary | 219/137 |
| 2,868,956 | 1/1959 | Lobosco | 219/137 |
| 2,876,330 | 3/1959 | Reinhardt | 219/137 |
| 3,059,099 | 10/1962 | Carpenter et al. | 219/137 |

Primary Examiner—J. V. Truhe
Assistant Examiner—George A. Montanye
Attorney—J. Maguire ABSTRACT: A combination of arc welding equipment and electrodes for depositing cladding material on the surface of a workpiece. The combination generally includes a welding head which carries at least two adjacently spaced continuously replenished consumable electrodes of cladding materials into arc welding relationship with respect to the workpiece to deposit a weld bead of cladding material thereon. Arcing current to the electrode is maintained while arcs are moved with respect to and over the workpiece surface and cladding material from the electrodes deposited thereon. At least one of the electrodes is positioned in lagging relationship with respect to the next adjacent electrode and laterally thereof so it deposits cladding behind and laterally of the next adjacent electrode for forming a weld bead with a more desirable contour for later fusion with a subsequently deposited weld bead. The electrode which subsequently fuses a later deposited weld bead with a previously deposited weld bead is preferably oriented over the lagging edge of the previously deposited weld bead and acts as an anode with respect to the workpiece, whereas the lagging electrode acts as a cathode with respect to the workpiece.

PATENTED NOV 30 1971 3,624,345

INVENTOR.
Frank W. Armstrong
BY
J. Maguire
ATTORNEY

ARC WELDING ELECTRODE ARRANGEMENTS

BACKGROUND AND SUMMARY OF THE INVENTION

With increasing frequency manufacturers of heavy industrial equipment are being called upon to clad their products with corrosion resistant materials such as stainless steel or Inconel. For example, the interior surface of a nuclear reactor pressure vessel is commonly clad with stainless steel to resist the destructive environment it is designed to contain. To meet this need, a variety of methods for rapidly depositing a layer of metal on a surface of a metal workpiece have been developed. The most successful utilize either a submerged arc welding arrangement wherein the welding head carries a consumable electrode of cladding material beneath a flux which may or may not be enriched with a consumable cladding material, or a gas metal arc welding arrangement wherein the welding head carries a consumable electrode of cladding material beneath a layer of inert gas. The methods generally include the steps of arcing the electrode to the surface to be clad to locally melt the surface and deposit melted cladding material thereon, relatively advancing the arc with respect to and over the workpiece surface, and continuously replenishing the consumables. As the melt cools behind the advancing electrode, it forms a surface of cladding material on the workpiece.

To increase the rate of deposition of cladding it has been proposed to increase the width of the weld bead by simultaneously feeding a plurality of electrodes, arranged in a side by side relationship, toward a common weld pool and advancing the electrodes abreast of one another over the surface of the workpiece. Experiments with such an arrangement have been notably unsuccessful when it is desired to lay down another weld bead next adjacent to a previously deposited weld bead, because of two observed phenomena: (1) The longitudinally extending side edges of the previously deposited weld bead tend to laterally roll over the workpiece surface while cooling; and, (2) A longitudinally extending edge of the subsequently deposited weld bead cannot be evenly fused with the edge of the previously deposited weld bead, even when the first phenomenon (1) is cured.

It has been experimentally determined that both of these problems can be cured by utilizing the improved arrangement of apparatus herein disclosed which comprises:

In combination, arc welding equipment comprising a welding head for carrying at least two adjacently spaced continuously replenished consumable electrodes comprising cladding material in arc welding relationship with respect to a workpiece to deposit a weld bead of cladding material thereon having longitudinally extending side edges, means for supplying arcing current to the electrodes, and means for relatively advancing the electrode arcs with respect to and over the workpiece surface; the improvement comprising means for positioning at least one of the electrodes in lagging relationship with respect to the next adjacent electrode and laterally thereof so that it deposits cladding material behind and laterally of the next adjacent electrode as the electrodes advance, said electrodes being straight polarity electrodes, and said at least one lagging electrode forming the weld bead with at least one lagging edge.

The aforesaid combination preferably further comprises means for positioning the electrodes to deposit another weld bead next adjacent the deposited weld bead including means for positioning an electrode of reverse polarity over the lagging edge of the previously deposited weld bead, the reverse polarity electrode being disposed in leading relationship with respect to the lagging electrode as the electrodes advance.

DESCRIPTION OF THE PREFERRED EMBODIMENT

Figure 1:
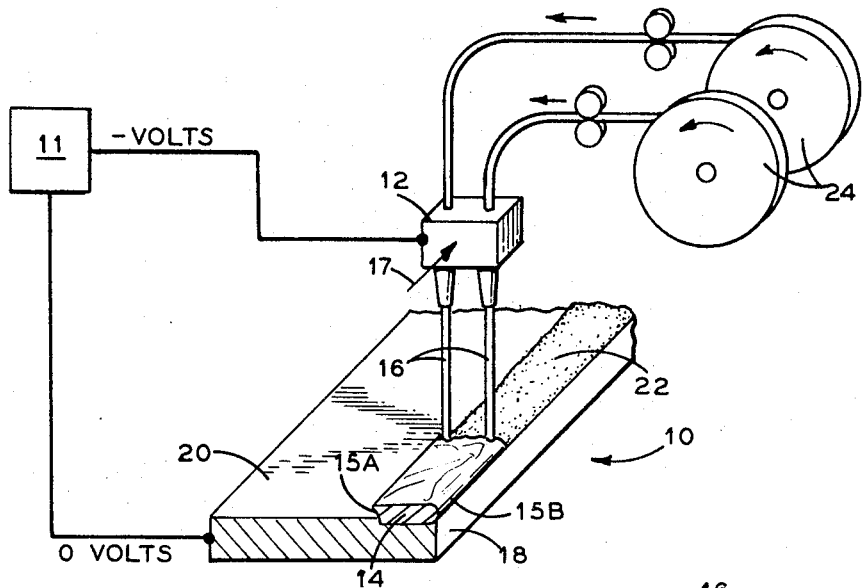
FIG. 1 is a schematic view of a typical arrangement of welding apparatus for overlay cladding a workpiece with a weld bead according to prior art.

Referring now to the drawings wherein like reference numerals designate like or corresponding parts throughout the several views there is shown in FIG. 1 a typical arrangement of submerged arc welding equipment 10 adapted to be energized by a source of direct current 11 and generally including a welding head 12 which acts as a guide for the ends of a plurality of continuously replenished consumable electrode wires 16 being fed toward a workpiece 18 and into arc welding relationship with respect to its surface 20 beneath a flux 22. The welding wires 16 preferably comprise a cladding material such as stainless steel or Inconel or other metal suitable for cladding steel, whereas the flux 22 may or may not be enriched with a granular consumable cladding material which is the same as the material deposited by the electrodes. The electrode wires 16, energized with current from the source 11, are fed by means well known in the art from remotely located supply rolls 24 at a rate which is synchronized with their rate of consumption.

The cladding process generally includes the steps of arcing the electrodes to the workpiece surface beneath the flux to locally melt the surface and deposit melted cladding material thereon, relatively advancing the arcs with respect to and over the workpiece surface while maintaining the electrodes in arcing relationship with respect to the surface, and continuously replenishing the consumables. With cooling, the melt behind the advancing electrodes fuses to the workpiece to form a cladding surface 14 thereon. The phrase "relatively advancing the arcs with respect to and over the workpiece surface" is intended to include either (1) linearly moving the arcs over the workpiece surface while the workpiece is held stationary, or (2) linearly moving the workpiece beneath the arcs while the arcs are held stationary, or (3) linearly moving both the workpiece and the arcs while the arcs are oriented over the workpiece, or (4) any combination of relative linear motion between the workpiece and arcs which is made for the purpose of continuously depositing an elongated weld bead downwardly upon the workpiece surface. However, to simplify the description of the preferred embodiments of the invention the workpiece is hereinafter assumed to be held stationary while the welding head, electrodes and arcs are linearly advanced over the surface of the workpiece.

Figure 2:
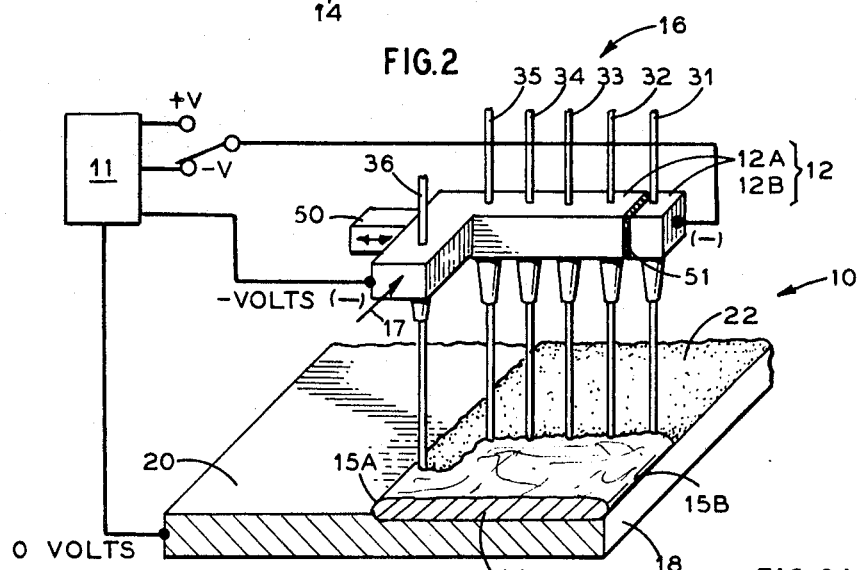
FIG. 2 is a figure similar to FIG. 1 showing an arrangement of electrodes for depositing a weld bead according to the invention.
Figure 4:
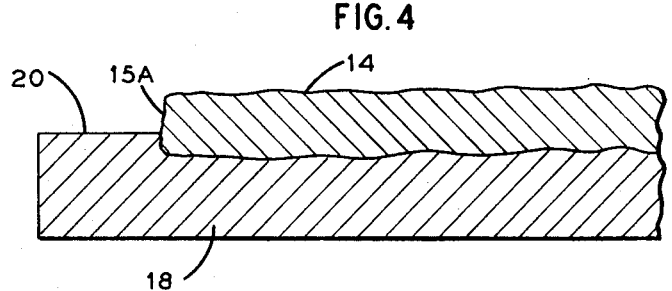
FIG. 4 is an end elevation of a weld bead deposited on a workpiece by apparatus according to the invention.
Figure 5:
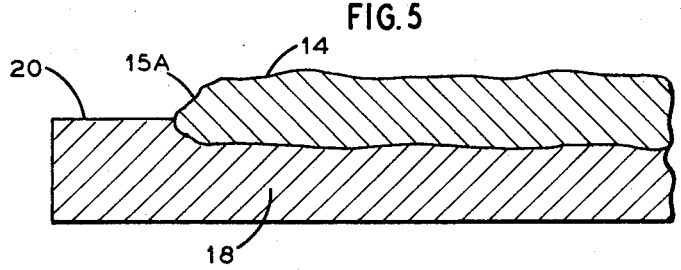
FIG. 5 is a figure similar to FIG. 4 showing a weld bead having a different edge contour then the weld bead shown in FIG. 4.

As shown in FIG. 2, in the preferred embodiment six consumable electrodes simultaneously deposit weld metal upon the workpiece surface. Five of the electrodes, 31 to 35 inclusive, are aligned in a side by side relationship and advanced abreast of one another in the direction of travel 17 of the welding head. The sixth electrode 36 is positioned out of alignment with the other electrodes and in lagging relationship with respect thereto so that it deposits weld metal behind and laterally of the aligned electrodes to form one of the longitudinally extending edges of the weld bead. Thus the sixth electrode 36 deposits weld metal for fusion with the workpiece surface and partially cooled weld metal deposited by the next adjacent electrode 35. As hereinbefore set forth, each of the electrodes is fed from a supply spool to replenish electrode material consumed during the welding process. With the preferred electrode arrangement, the contour of the longitudinally extending edge 15A formed by the sixth electrode tends to be either vertically oriented with respect to the workpiece surface as shown in FIG. 4, or inclined toward the axis of the weld bead as shown in FIG. 5, rather than being inclined away from the axis of the weld bead and rolled over the surface of the workpiece as shown in FIG. 6.

Figure 6:
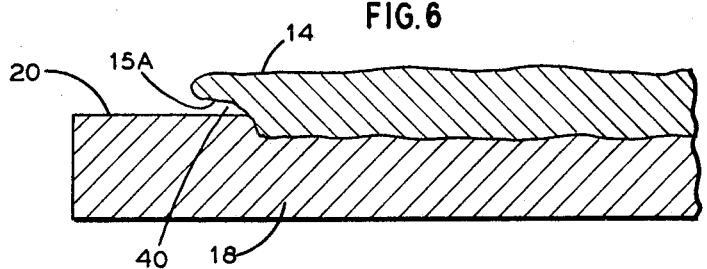
FIG. 6 is a figure similar to FIGS. 4 and 5 showing a weld bead having an edge contour as formed by prior art electrode arrangements, exaggerated for clarity.

The weld bead edge shown in FIG. 6 is characteristic of the type of edge obtained when depositing a weld bead with a plurality of electrodes which are all aligned with one another and advanced abreast of one another. The uppermost portion of the edge tends to roll over the workpiece surface so that it overhangs the surface and forms an air cavity 40 therebetween. In practice, it has been found that a subsequently deposited weld bead cannot be relied upon to penetrate into the cavity and properly fuse with the rolled over edge and workpiece surface therebeneath, mainly because inclusions of air and slag cannot be eliminated from the cavity 40. Accordingly, it is a feature of the invention to form at least one of the longitudinally extending edges of a previously deposited weld bead with a lagging electrode to eliminate the rolled over edge configuration. The edge which is formed with a lagging electrode will be hereinafter be referred to as a lagging edge of a given weld bead.

In the welding arts, when the electrode acts as a cathode and the workpiece an anode, it is said that the welding arc is of "straight polarity" or the electrodes are "straight polarity electrodes"; whereas when the electrode acts as an anode and the workpiece a cathode, it is said that the welding arc is of "reverse polarity" or the electrode is a "reverse polarity electrode." With either arrangement the cathode absorbs most of the heat during a welding operation and as a consequence is more rapidly melted than the anode. Accordingly, in cladding operations, where it is undesirable to dilute the workpiece surface any more than is necessary to fuse the cladding therewith, straight polarity electrodes are utilized since they tend to melt, or dig into, the surface less than reverse polarity electrodes. For example, the lagging electrode hereinbefore described is preferably a straight polarity electrode. However, it has been found that if the electrode which forms and fuses the edge of a subsequently deposited weld bead with a lagging edge of a previously deposited weld bead is a reverse polarity electrode, and is oriented over the lagging edge of the previously deposited weld bead, the weld beads are more effectively and evenly fused together. The electrode of reverse polarity will hereinafter be referred to as a leading electrode, and the edge which is formed with a leading electrode will hereinafter be referred to as a leading edge. It should be noted that the lagging electrode lags the leading electrode, or vice versa.

Figure 3A:
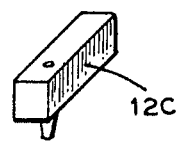
FIG. 3A is a schematic view of a welding head.
Figure 3:
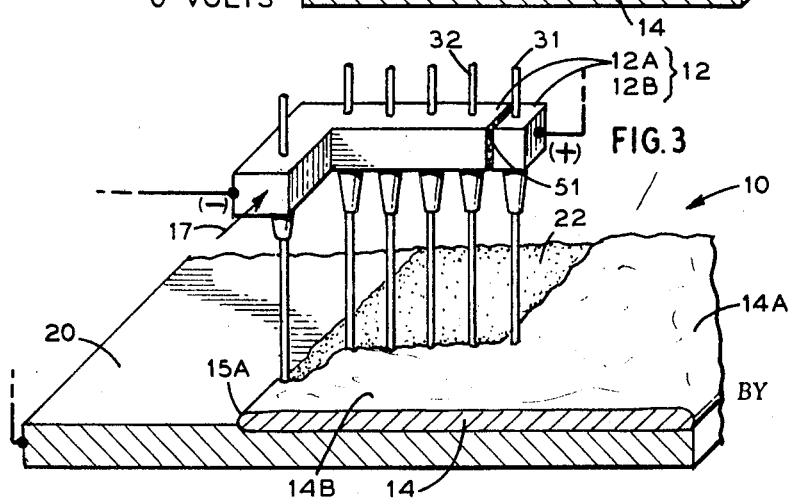
FIG. 3 is a figure similar to FIG. 2 showing a weld bead being deposited next adjacent a previously deposited weld bead.

As shown in FIG. 3, it is a feature of the preferred embodiment of the invention to so orient a leading electrode to fuse a subsequently deposited weld bead 14B with a previously deposited weld bead 14A. In practice, electrode 31 is always held at a positive potential with respect to the workpiece and simply not used for depositing the first weld bead. Alternatively, all six electrodes may be negatively polarized with respect to the workpiece as shown in FIG. 2 when the first weld bead is deposited, and thereafter electrode 31 may be switched to a positive polarity to deposit the second and other subsequently deposited weld beads. Of course, in the preferred embodiment, the source of current is adaptable to energizing electrodes both positively and negatively with respect to the workpiece.

In another embodiment, electrode 31 may be a lagging electrode for forming a first deposited weld bead with two lagging edges. This arrangement may be used, for example, when it is desired to buildup a surface with a single weld bead of cladding having edges as shown in either FIGS. 4 and 5, rather than as shown in FIG. 6. To arrange for this contingency and any other electrode arrangement wherein it is desirable to replace electrode 31 or disconnect the same from the welding head, the welding head may be comprised of two sections 12A and 12B insulated from one another by an insulating material 51, section 12B being removably connected to section 12A by means well known in the art for replacement with the removable section 12C shown in FIG. 3A. Section 12C is an elongated head section mountable in place of section 12B for guiding an electrode 31 in leading relationship with respect to the next adjacent electrode 32. As a further alternative, section 12C may be permanently mounted on section 12B with provision made for guiding an electrode either as shown in FIGS. 2 and 3 or as shown in FIG. 3A, e.g., provided with means for guiding an electrode either abreast of, or in lagging relationship with respect to, electrode 32. Of course, without departing from the spirit and scope of the invention, sections 12A and 12B may be separate welding heads adapted to advance together for relatively advancing the electrode arcs with respect to and over the workpiece surface.

In accordance with the invention, a flat workpiece surface may be clad with the foregoing improved electrode arrangements by depositing a first weld bead utilizing at least two straight polarity electrodes and depositing the second and other subsequently deposited weld beads utilizing at least two electrodes of opposite polarity. A reverse polarity electrode is not needed to form edge 15B when depositing the first weld bead since one of the edges of the first deposited weld bead need not necessarily be fused with a previously deposited weld bead. However, in the preferred embodiment, the first weld bead and all subsequently deposited weld beads are formed with at least one lagging electrode.

Assuming the first weld bead has been deposited and it is desired to subsequently deposit another, some means such as an indexing arrangement must be provided for moving the welding head laterally of the longitudinal length of the last deposited weld bead and into position for subsequently depositing another weld bead next adjacent thereto. It is assumed that means well known in the art are provided for so positioning and/or repeatedly positioning the electrodes and that the means includes means for positioning the leading electrode over the lagging edge of a previously deposited weld bead.

Cylindrically shaped workpiece surfaces may be clad in the same manner as flat workpiece surfaces. Alternatively, they may be clad with the inventive electrode arrangements by using means well known in the art for continuously depositing a helically shaped cladding bead on the desired surface. In this case, means are provided to continuously move the welding head parallel to the longitudinally extending axis of the workpiece as the workpiece is rotated for depositing bead next adjacent previously deposited bead. With each revolution of the workpiece a 360° segment of the weld bead is deposited and the welding head moved parallel to the axis of the workpiece whatever distance is necessary to deposit the subsequently deposited 360° weld bead segment next adjacent the last previously deposited segment, and so on. After the first 360° weld bead segment is deposited utilizing at least two straight polarity electrodes, the second and other subsequently deposited segments are deposited utilizing at lest two electrodes of opposite polarity. Again, it is assumed that the mans for positioning the welding head includes means for positioning the leading electrode over the lagging edge of the last deposited weld bead segment. For the purpose of this disclosure the phrase "weld bead segment" is to be considered to be synonymous with the phrase "weld bead."

In any of the arrangements hereinbefore described it is desirable to oscillate the electrodes, by means of an oscillator 50, laterally of the longitudinal length of a given weld bead as the weld bead is deposited to cause the electrodes to dwell while forming the longitudinally extending side edges thereof. In practice, the oscillator sinusoidally displaces the electrode with respect to the longitudinally extending axis of the weld bead as the electrodes are relatively advanced with respect to and over the workpiece surface.

In the preferred embodiment, electrodes 32 to 36 inclusive are laterally spaced apart from each of their next adjacent neighbors three-fourths of an inch; except, electrode 31 is laterally spaced apart from electrode 32 five-eighths of an inch, and electrode 36 is additionally disposed to lag electrode 35 five-sixteenths of an inch. The spacing measurements are proportionally related to one another, but may be varied plus or minus not more than one-eighth of an inch, without departing from the spirit and scope of the invention, if the proportional relationship is maintained. Additionally, electrode 31 is oriented over the previously deposited weld bead five-sixteenths to seven-sixteenths of an inch. In all cases, the positively and negatively charged electrode arc lengths are adjusted to be of a lesser length than the spacing between electrodes to avoid sidewise arcing therebetween and lateral deposition of cladding material. In addition, in the preferred embodiment, the oscillator is operated at 72 c.p.m. plus or minus 10 c.p.m. to carry the head, and thus the arcs, five-sixteenths of an inch in either direction laterally of the relative direction of advancement of the arcs with respect to and over the workpiece. However, in general, the oscillator displaces the welding head in either direction not more than one-half the lateral distance between any two adjacent straight polarity electrodes, a small amount of overlapping deposit being allowable insofar as the reverse polarity electrode and the electrode next adjacent thereto are concerned.

What is claimed is:

1. In a multiple-arc cladding process having a plurality of consumable electrodes mounted in a welding head for movement relative to and over a workpiece surface for deposition of cladding metal thereon and having means for supplying arcing current to the electrodes, the steps of the process comprising forming a weld bead edge from a lagging straight polarity end electrode positioned laterally and behind other adjacently spaced straight polarity depositing electrodes, and depositing metal along the weld bead edge formed by the lagging electrode from a reverse polarity electrode spaced adjacent the other straight polarity electrodes and positioned laterally and forward of the lagging electrode.

* * * * *